Nov. 13, 1956  W. W. YEANDLE ET AL  2,770,008
APPARATUS FOR PRODUCING UREA PRILLS
Filed July 14, 1954  3 Sheets-Sheet 1

INVENTORS.
WILLIAM W. YEANDLE
NOLAN A. CARTER
BY JAMES T. BURNELL

ATTORNEY

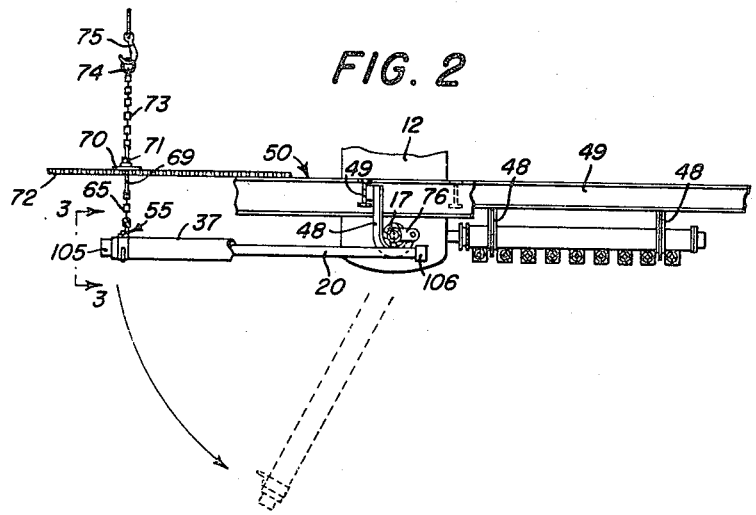
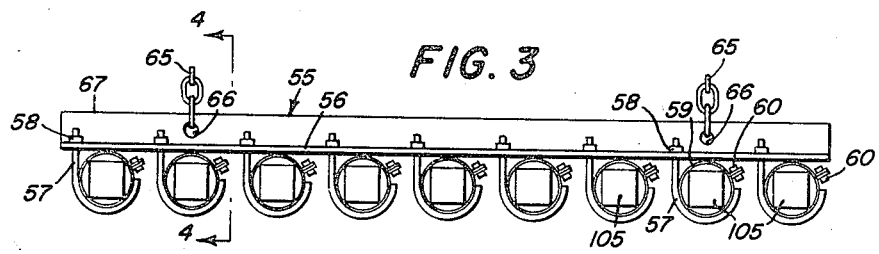
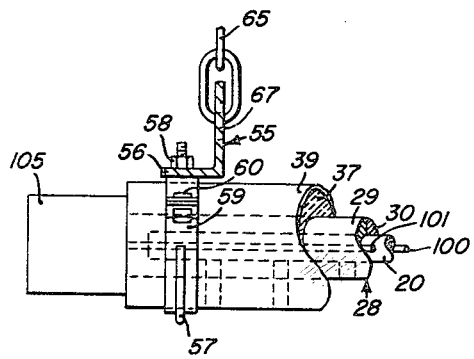

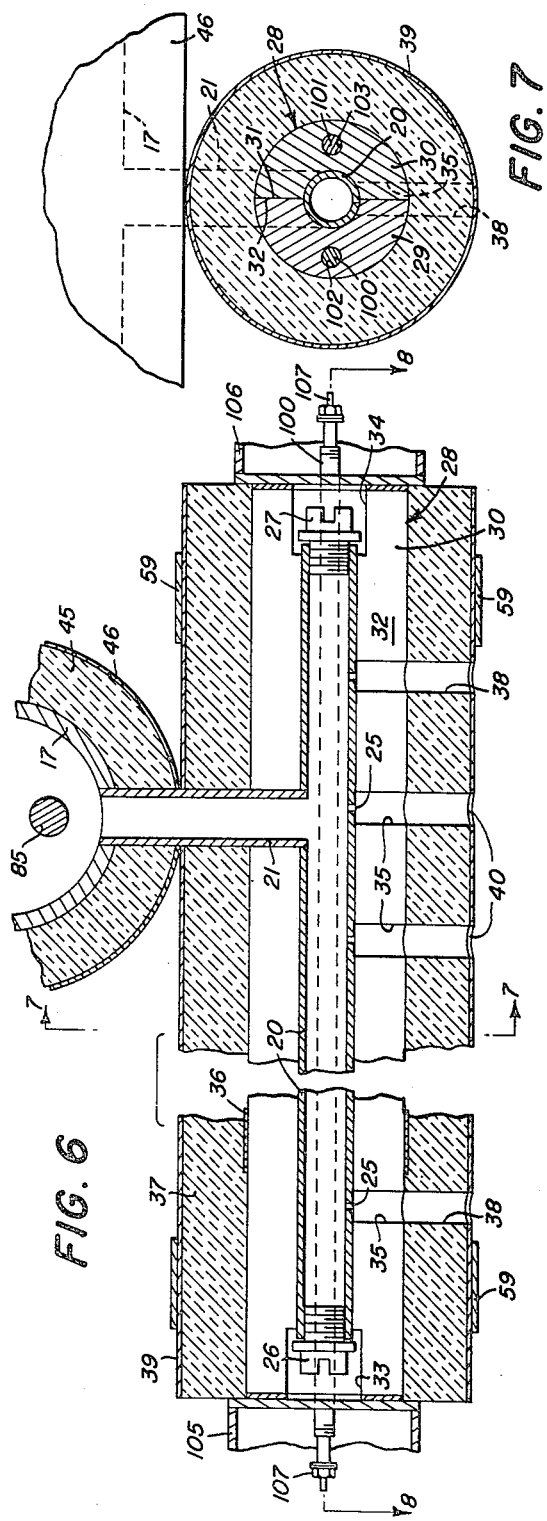

United States Patent Office 2,770,008
Patented Nov. 13, 1956

2,770,008

APPARATUS FOR PRODUCING UREA PRILLS

William W. Yeandle, Nolan A. Carter, and James T. Purnell, Pryor, Okla., assignors to Deere & Company, Moline, Ill., a corporation of Illinois Application July 14, 1954, Serial No. 443,204

15 Claims. (Cl. 18—2.4)

The present invention relates generally to the production of urea and more particularly to the forming of the urea into granules or prills which are hard, dry, and free-flowing and therefore are easily handled in sacks and other types of containers without the tendency to solidify or cake.

Although the art of prilling has been practiced upon other chemicals, such as ammonium nitrate, as disclosed in Patents No. 2,402,192 and No. 2,528,407, we are not aware that it has been applied to urea of the grades used for fertilizer and other agricultural and technical uses. In prilling ammonium nitrate it is the usual practice to spray a concentrated solution having about 5% moisture content into a cooling medium such as air, after which the prills are collected and put through an elaborate cooling and drying process in which a portion of the prills are recycled. This is an expensive process to install and operate. However, a 5% moisture content is considered necessary in order to avoid decomposition which occurs at lower moisture contents.

One of the objects of the present invention relates to devising a method of prilling urea which does not involve the use of expensive drying equipment and without decomposition of the material.

We have found that in the process of prilling urea the necessity for drying apparatus can be eliminated by prilling the urea with a moisture content of less than 1% and preferably substantially .5%. This can be accomplished without substantial decomposition if the temperature be maintained at a value slightly above the melting or freezing temperature of urea. This temperature is 266° F. for 100% concentration and very close to 262° F. for a concentration of 99.5% or .5% moisture.

The preferred moisture content should be maintained at .5% and the temperature should be maintained slightly above 262° F. with a variation of no more than plus or minus 1° F.

Another object of this invention relates to the provision of apparatus for accurately maintaining the urea at the specified temperature at the point where the urea is sprayed into the cooling medium. In the accomplishment of this object, electrical heating elements are disposed parallel to the sparger pipes in a heat-conductive casing therewith and other electrical heating elements are disposed within the header pipes in contact with the fluid therein. The heat output of the elements can be accurately controlled to hold the urea at the proper temperature, or it can be substantially increased to melt solidified urea after a shut-down.

These and other objects and advantages of this invention will be apparent to those skilled in the art after a consideration of the following description, in which reference is had to the drawings appended hereto, in which Fig. 1 is a top plan view of the prilling apparatus taken in section through the prilling tower.

Fig. 2 is an elevational view of the prilling apparatus, illustrating in dotted lines the method of removing one of the quadrants of sparger pipes.

Fig. 3 is an elevational view taken along a line 3—3 in Fig. 2 showing, on an enlarged scale, the supporting member for the sparger pipes.

Fig. 4 is a still further enlarged sectional view of the support taken along a line 4—4 in Fig. 3, the sparger pipe and its coverings being broken away.

Fig. 6 is an enlarged sectional elevational view taken along a line 6—6 in Fig. 1 showing the details of one of the sparger pipes and its connection to the header pipe, portions of said pipes being broken away.

Fig. 7 is a section taken along a line 7—7 in Fig. 6.

Fig. 8 is a plan view taken in section along a line 8—8 in Fig. 6.

Figure 1:
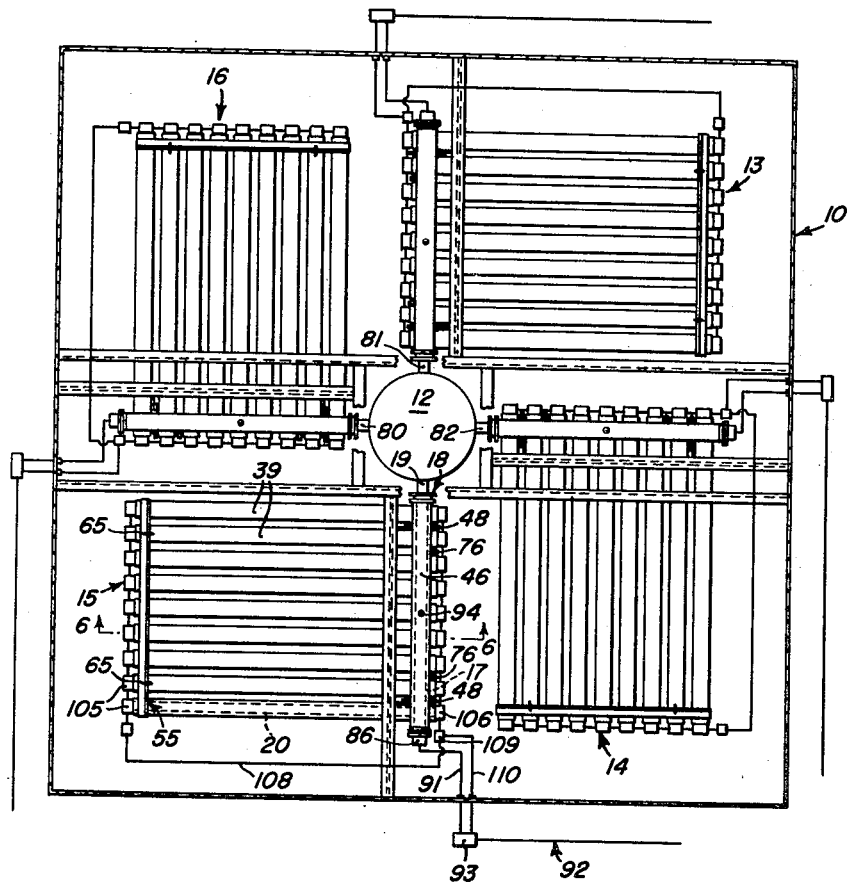
Figure 5:
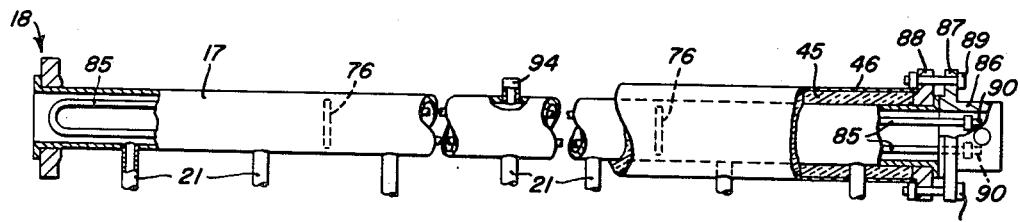
Fig. 5 is an elevational view, partly in section, of one of the header pipes, portions thereof being broken away.

Referring now to the drawings and more particularly to Fig. 1, the prilling tower is indicated by reference numeral 10. This tower is an enclosed structure, preferably substantially square in cross section and in the order of 150 to 200 feet in height, at the top of which is disposed the spraying equipment from which the molten urea is sprayed and allowed to drop through the interior of the tower. During its drop to the bottom of the tower through the air the molten urea solidifies and is collected at the bottom in the form of prills or granules.

The prilling apparatus comprises a centrally disposed head tank 12, to which the molten urea is conducted through a main supply pipe (not shown), and to which is connected a plurality of banks of sparger pipes. In the preferred embodiment, there are four quadrants of sparger pipes, the quadrants being indicated by reference numerals 13, 14, 15, and 16, respectively.

Inasmuch as the quadrants 13, 14, 15, and 16 are identical in construction, a description of one will suffice for all. Each quadrant comprises a header pipe 17 connected by means of a suitable flanged coupling 18 to a stub pipe 19 extending into the head tank 12. A row of sparger pipes 20 is disposed beneath the header pipes 17 transversely of the latter and connected to the header pipes by means of short vertically disposed connecting pipes 21.

Each sparger pipe 20 is provided with a row of sparger orifices 25, which are preferably in the order of .035 inches in diameter along the bottom of the sparger pipe. The two ends of the sparger pipe 20 are closed by means of pipe plugs 26, 27 threaded into the ends thereof.

As best shown in Figs. 6, 7, and 8, each of the sparger pipes 20 is imbedded in a substantially solid metal casing 28, preferably of aluminum, and constructed in two hemicylindrical elements 29, 30 disposed in juxtaposition with the flat inner sides 31, 32 in contact with each other, such sides being recessed to receive the sparger pipe 20 and the vertical connecting pipe 21 in close-fitting contacting relation. The ends of the casing 28 are hollowed or recessed, as indicated at 33 and 34, to provide room for the pipe plugs 26, 27 and to permit their installation and removal without removing the casing 28 from the sparger pipe 20.

Each of the casings 28 is hollowed or recessed to provide vertical openings 35 in register with the sparger orifices 25, respectively. The vertical openings 35 are appreciably larger in diameter than the orifices and are preferably in the order of one-half inch in diameter. The two hemispherical sections 29 and 30 of the heat-conductive casing 28 are secured together about the sparger pipes 20 by means of a strap band 36. A layer of heat-insulating material 37 covers the exterior surface of the casing 28 and can be of any material that is suitable for this purpose and the temperatures specified herein. We have found that a foam-type insulation of glass or other like material is satisfactory for this purpose. The insulating layer 37 is provided with apertures 38 disposed in register with the openings 35 in the casing 28 and also in register with the sparger orifices 25 in the sparger pipes 20.

A jacket 39 of aluminum or other suitable material encloses the insulation 37 and secures the entire sparger assembly in one unitary structure. The jacket 39 is provided with holes 40 in register with the apertures 38 and 35 and the orifices 25, respectively.

The header pipe 17 is also enclosed in a layer of heat-insulating material 45 which is similar to the layer 37 around the sparger pipes. It is enclosed in a metallic jacket, preferably aluminum, indicated by reference numeral 46.

The sparger pipes are rigidly connected to the header pipes 17 by the connecting pipes 21 which are rigidly welded at opposite ends thereof respectively to the sparger pipes 20 and the header pipes 17 to form one rigid unitary structure. The opposite ends of each of the quadrants are supported by means of a transverse angle iron 55 having a horizontal flange 56 from which are suspended a row of U-bolts 57 by means of nuts 58 engaging the flange 56. The U-bolts 57 are curved downwardly under the sparger pipes and clamp the latter to the angle iron 55. Each of the sparger pipes is provided with a strap band 69 clamped around the metal jacket 39 by means of a clamping bolt 60 and the strap band is positioned between the jacket 39 and the U-bolt 57 to prevent the latter from denting the jacket 39. Other strap bands 59 are located along the sparger pipes to secure the jacket 39 and insulating layer 37 around the casing 28.

The outer end of each quadrant is carried by means of a pair of chains 65 which engage apertures 66 in the vertical flange 67 of the angle iron 55. Each of the chains 65 is connected to the lower end of a threaded rod 69 which passes through a bar or plate member 70 that rests on top of a grating 72. A pair of nuts 71 are threaded on the rod 69 above the plate 70, the latter being adapted to pass through the grating 72 in one position, but which can be turned 90° to rest securely upon the grating to hold the quadrant in generally horizontal position. The sparger pipes can be leveled by adjusting the nuts 71 vertically along the threaded rods 69.

A pair of chains 73 are connected to the upper ends of the threaded rods 69 and have at their upper ends a pair of rings 74 which can be engaged by a pair of hoist hooks 75. These hooks 75 can be raised and lowered by any suitable form of hoist mechanism (not shown), in order to swing the quadrant angularly about the axis of the header pipe 17 during installation or removal of the quadrant.

In order to remove one of the quadrants the coupling 18 must first be disconnected to permit the header pipe 17 to rotate within the supporting hooks 48. The hoist hooks 75 are hooked into the rings 74 and the weight is then relieved from the plates 70 by slightly raising the chains 73, to permit the plates 70 to be turned to a position in which they will pass downwardly through the grating 72. The quadrant can then be lowered angularly, as indicated by the arrow and by the dotted-line position in Fig. 2, until the quadrant is hanging substantially vertically from the header pipe 17.

The header pipe 17 is provided with a pair of apertured lugs 76 secured, as by welding, to the pipe and extending generally parallel to the sparger pipes 20, as best shown in Fig. 2. Thus, when the quadrant is lowered to a generally vertical position, the hooks 75 can be removed from the chain rings 74 and hooked into the apertured lugs 76 to raise the quadrant off the hooks or hangers 48.

In addition to the connecting pipes 19 there are three other connecting pipes 80, 81 and 82 extending outwardly from the head tank 12 in a generally horizontal plane and spaced 90° apart, each of them being connected to one of the other quadrants 13, 14, and 16, respectively.

In order to prevent the molten urea from freezing or solidifying in and around the orifices 25, sparger pipes 20, connecting pipes 21, and header pipes 17, electrical heating units are provided to control the temperature of the melt. This electrical heating apparatus will now be described. In each of the headers pipe 17 is disposed a U-shaped electrical heating element or rod 85, which is substantially coextensive with the header pipe 17 and has its closed end near the coupling 18. The two ends of the U-shaped heating element 85 are brought out of the opposite end of the pipe 17 and extend into a terminal box 86 which covers the open end of the header pipe and is provided with a flange 87 that is detachably connected to a flange 88 on the outer end of the header pipe 17, by means of clamping bolts 89. The two ends of the rod 85 serve as electrical terminals 90 by means of which the heating element 85 is connected to a source of electrical energy by means of an electrical circuit, indicated schematically at 91 in Fig. 1. The circuit 91 is brought out of the tower 10 and connected to the source of power, indicated at 92, by means of a control box 93 containing the necessary switches and other electrical mechanism for controlling the heat output of the heating element 85. Inasmuch as the details of the electrical circuit are well known to those skilled in the art, they are not described herein but merely indicated schematically.

The temperature of the melt within the header can be measured by means of a suitable thermometer or thermostat extending into the header pipe 17 through a bushing 94. The details of the temperature-indicating equipment are not an essential part of the present invention, for any suitable apparatus of this type can be used.

Each of the sparger pipes 20 is heated by a pair of electrical heating rods or elements 100, 101, which are inserted through apertures 102, 103 that extend axially through the two casing elements 29 and 30, respectively, substantially parallel to the axis of the sparger pipe 20. The heating rods 100, 101 are brought out of the casing 28, at both ends thereof, into a pair of terminal boxes 105, 106, the ends of the rods or elements serving as terminals 107 for making connections to the electrical source of supply 92. As shown diagrammatically in Fig. 1, the terminals in the outer terminal boxes 105 are connected through a circuit 108 to a connection box 109 where they are combined with connections from the opposite terminal boxes 106 and are brought out through a circuit, indicated diagrammatically by reference numeral 110, to the control box 93. The output of the heating elements 100, 101 can also be varied by suitable control equipment in the control box 93 in order to maintain the melt in the sparger pipes at the proper temperature. By providing a wide range of adjustment of the current in the heating rods 85, 100, 101, the elements can be used both for melting any solidified urea that has been allowed to cool, as during a shut-down, or to maintain a constant temperature of the melt during operation.

In the operation of the apparatus and method of prilling urea, the urea is introduced into the head tank 12 in a molten form with a moisture content of substantially less than 1% and preferably about one-half of 1%, in other words a concentration of 99½%. The melting point of a 100% concentration is 266° F., but at a concentration of 99½% it is about 262° F. It is important, therefore, that the temperature of the molten urea be maintained at slightly above this temperature at the orifices of the sparger pipes. Preferably, the temperature should be maintained at substantially 266° F. which is slightly above the melting point of the melt but is not high enough to cause decomposition. By maintaining a head of urea in the head tank 12 in the order of approximately 2½ to 5 feet, a sufficient pressure is maintained at the orifices to eject or spray the molten urea downwardly through the registering openings in the casing 28 and the insulation 37. The molten urea drops through the air in the tower, which causes the molten urea to solidify before it strikes the bottom. It may be desirable to create a draft of air upwardly through the tower in the event that more cooling is desired.

It will be noted that the solid aluminum casing 28 serves as a heat conductor to conduct heat from the electrical heating elements 100, 101 to the sparger pipes 20 and also to act as a heat storage element to prevent rapid fluctuation of the temperature in the sparger pipes. It is desirable to hold the temperature of the melt within a range of plus or minus 1° F.

We do not intend to limit our invention to the particular details shown and described herein except as set forth in the following claims.

We claim:

1. In apparatus of the class described, a header pipe, a generally horizontal sparger pipe connected thereto, said sparger pipe having a row of orifices in the bottom thereof, a heat storage casing enclosing said sparger pipe and having an inner surface in contact with a major portion of the outer surface of said sparger pipe to permit transfer of heat by conduction therebetween, and an insulating cover on the outside of said casing, said casing and cover having enlarged passages aligned with said orifices to provide for escape of liquid from said sparger pipe.

2. The combination set forth in claim 1 including the further provision that said casing comprises a pair of hemicylindrical metal elements having complementary recesses adapted to receive said sparger pipe therebetween, and means clamping said elements together.

3. The combination set forth in claim 1 including the further provision that said casing is provided with a longitudinally extending passage spaced outwardly of said sparger pipe, and heating means within said passage.

4. The combination set forth in claim 2 including the further provision that each of said metal elements has a passage extending longitudinally therein adjacent said sparger recess, and a heating element disposed within each of said passages.

5. In apparatus of the class described, a header pipe, a generally horizontal sparger pipe connected thereto, said sparger pipe having a row of orifices in the bottom thereof, a heat storage casing enclosing said sparger pipe, said casing comprising a pair of hemicylindrical metal elements having complentary recesses adapted to receive said sparger pipe therebetween, there being vertical passages in the lower side of said casing in register with said orifices, and means for clamping said elements together.

6. The combination set forth in claim 5, including the further provision that each of said casing elements is provided with a longitudinally extending passage offset from the sparger pipe receiving recess and an electrical heating rod disposed within said passage.

7. The combination set forth in claim 6, including the further provision of a cover of heat insulating material around said casing and a metal jacket enclosing said cover, there being vertical passages in said cover and holes in said jacket in register with said passages in said casing and said orifices.

8. In apparatus of the class described, a header pipe, a generally horizontal sparger pipe connected thereto, said sparger pipe having a row of orifices in the bottom thereof, a heat storage casing enclosing said sparger pipe, said casing comprising a pair of juxtaposed hemicylindrical metal elements having complementary recesses adapted to receive said sparger pipe therebetween and positioned with the parting plane substantially vertical, there being complementary recesses in the adjacent sides of said elements defining vertical passages in register with said orifices and longitudinal passages offset from said recesses, and a pair of electrical heating rods disposed within said passages.

9. In prilling apparatus, a header pipe, an electrical heating element disposed within said pipe, a layer of heat insulating material enclosing said pipe, a row of sparger pipes disposed transversely of said header pipe and connected thereto, heat conducting casings enclosing said sparger pipes, said casings being provided with electrical heating units embedded therein, and a layer of heat insulating material enclosing each of said sparger pipes, there being prilling orifices in said sparger pipes and passages in said casings and said insulating layers in register with said orifices.

10. In prilling apparatus, a head tank, a header pipe having one end connected with said tank, an electrical heating element disposed in said header pipe and provided with two terminals at the other end of said pipe, a row of sparger pipes disposed transversely of said header pipe and connected in communication therewith, an electrical heating element extending alongside each sparger pipe, and heat conducting means connecting said element and said sparger pipe for conveying heat therebetween.

11. The combination set forth in claim 10 including the further provision that said heat conducting means comprises a pair of hemicylindrical metal elements disposed in juxtaposition and having recesses in the adjoining surfaces adapted to receive the sparger pipe therebetween and having said electrical heating element embedded therein, said heating element having an electrical terminal adjacent each end of its associated sparger pipe.

12. In prilling apparatus, a head tank, a header pipe having one end connected with said tank, a row of sparger pipes disposed transversely of said header pipe and connected in communication therewith, and an electrical heating element disposed within said header pipe and extending substantially coextensive with said row of sparger pipes, and a pair of terminals disposed at the opposite end of said header pipe and connected with said element.

13. In prilling apparatus, a head tank, a header pipe having one end connected with said tank, a row of sparger pipes disposed transversely of said header pipe and connected in communication therewith, and an electrical heating element disposed within said header pipe, said element comprising a V-shaped resistance rod extending across the row of sparger pipes, the two adjacent ends of said rod extending beyond the outer end of said header pipe to serve as terminals, and a terminal box mounted on said outer end for enclosing said terminals.

14. In prilling apparatus, a sparger pipe having a row of prilling orifices, an electrical heating element comprising a resistance rod disposed alongside said sparger pipe in substantially parallel relation, and heat conductive means enclosing said pipe and said rod for transmitting heat therebetween.

15. The combination set forth in claim 14 including the further provision of a pair of terminal boxes at opposite ends of said sparger pipe, respectively, and terminals in said boxes connected respectively to the two ends of said rod.

References Cited in the file of this patent

UNITED STATES PATENTS

| | | |
|---|---|---|
| 2,360,094 | Arvins | Oct. 10, 1944 |
| 2,528,407 | Yeandle | Oct. 31, 1950 |
| 2,538,345 | Whaley | Jan. 16, 1951 |
| 2,551,452 | Moss | May 1, 1951 |
| 2,557,549 | Labour | June 19, 1951 |
| 2,562,149 | Mollring | July 24, 1951 |
| 2,597,744 | Morrison | May 20, 1952 |